United States Patent
Luzhanskiy et al.

(10) Patent No.: US 9,312,966 B1
(45) Date of Patent: Apr. 12, 2016

(54) FADE TOLERANT OPTICAL COMMUNICATION RECEIVER

(71) Applicant: James D. Crockett, Pasadena, CA (US)

(72) Inventors: Eduard Y. Luzhanskiy, Ellicott City, MD (US); James D. Crockett, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/553,043

(22) Filed: Nov. 25, 2014

(51) Int. Cl.
*H04B 10/67* (2013.01)
*H04B 10/69* (2013.01)
*H04B 10/112* (2013.01)

(52) U.S. Cl.
CPC ............ *H04B 10/673* (2013.01); *H04B 10/112* (2013.01); *H04B 10/6931* (2013.01)

(58) Field of Classification Search
CPC . H04B 10/112; H04B 10/673; H04B 10/6931
USPC ......................................... 398/118, 120, 208
See application file for complete search history.

(56) References Cited

U.S. PATENT DOCUMENTS

| | | | | |
|---|---|---|---|---|
| 6,055,094 A * | 4/2000 | Shima | ................ | H04B 10/2912 359/337.11 |
| 6,208,843 B1 * | 3/2001 | Huang | ................... | G08C 17/02 455/76 |
| 6,239,888 B1 * | 5/2001 | Willebrand | ........ | H04B 10/1125 398/118 |
| 6,980,747 B1 * | 12/2005 | DeSalvo | .............. | H04B 10/675 356/73.1 |
| 2011/0274429 A1 * | 11/2011 | Caplan | ............... | H04B 10/5561 398/65 |

\* cited by examiner

*Primary Examiner* — Dalzid Singh
(74) *Attorney, Agent, or Firm* — Tarolli, Sundheim, Covell & Tummino LLP

(57) ABSTRACT

A system includes a first low noise amplifier (LNA) having a first gain to amplify an optical input signal and to generate an amplified optical output signal. The first gain is set to compensate for signal losses in the optical input signal due to atmospheric fading. A second LNA having a second gain amplifies the amplified optical output signal from the first LNA and generates a saturated output signal when the combined first and second gain of the first LNA and the second LNA exceeds a predetermined output saturation level of a photo detector.

20 Claims, 5 Drawing Sheets

FADE TOLERANT OPTICAL COMMUNICATION RECEIVER

TECHNICAL FIELD

This disclosure relates to optical communications, and more particularly to optical preamplifiers that increase the dynamic range that can be processed by a detector.

BACKGROUND

Free space optical communication has attracted considerable attention recently for a variety of applications. Because of the complexity associated with phase or frequency modulation, current free-space optical communication systems typically use intensity modulation with direct detection (IM/DD). Atmospheric turbulence can degrade the performance of free-space optical links, particularly over ranges of the order of 1 km or longer. Lack of homogeneity in the temperature and pressure of the atmosphere, for example, can lead to variations of the refractive index along the optical transmission path. Such refractive index variations can deteriorate the quality of the received image and can cause fluctuations in both the intensity and the phase of the received optical signal. These fluctuations, which are also referred to as fading, can lead to an increase in the link error probability, limiting the performance of optical communication systems. Aerosol scattering effects caused by rain, snow and fog can also degrade the performance of free-space optical communication systems.

For optical communications systems design, the effects of fading must be accounted for to ensure reliable system operation. In suitable atmospheric conditions, received optical signals may be strong which could saturate a photo detector at the optical receiver. In poor atmospheric conditions, weak optical signals need to be boosted over background noise levels in order to properly distinguish transmitted data from noise. Thus, optical systems needs to be designed to operate over a fairly large dynamic power range accounting for strong signal strength under optimal conditions and weak signal strength under poor conditions. Previous attempts at addressing the dynamic range issues due to fading have focused on variable gain optical amplification systems which attempt to determine the atmospheric condition at the time and adjust the optical gain of the system accordingly. These systems however introduce path delays in the received optical signal which can lower overall system bandwidth. Such systems also require complicated control loops to adjust the gain which can add significantly to system complexity and cost.

SUMMARY

This disclosure relates to optical amplification and communications systems. In one aspect, a system includes a first low noise amplifier (LNA) having a first gain to amplify an optical input signal and to generate an amplified optical output signal. The first gain is set to compensate for signal losses in the optical input signal due to atmospheric fading. A second LNA having a second gain amplifies the amplified optical output signal from the first LNA and generates a saturated output signal when the combined first and second gain of the first LNA and the second LNA exceeds a predetermined output saturation level of a photo detector.

In another aspect, an optical preamplifier includes a first low noise amplifier (LNA) having a first gain to amplify an optical input signal and to generate an amplified optical output signal. The first gain is set to compensate for signal losses in the optical input signal due to atmospheric fading. A second LNA having a second gain amplifies the amplified optical output signal from the first LNA and generates a saturated output signal when the combined first and second gain of the first LNA and the second LNA exceeds a predetermined output saturation level of a photo detector. An optical attenuator limits the saturated signal output of the second LNA from saturating the photo detector.

In yet another aspect, an optical preamplifier includes a first low noise amplifier (LNA) having a first gain to amplify an optical input signal and to generate an amplified optical output signal. The first gain is set to compensate for signal losses in the optical input signal due to atmospheric fading. A first band pass filter filters the amplified optical output signal generated by the first LNA to provide a first filtered output signal. A second LNA having a second gain amplifies the first filtered output signal from the first band pass filter and generates a saturated output signal when the combined first and second gain of the first LNA and the second LNA exceeds a predetermined output saturation level of a photo detector. A second band pass filter filters the saturated output signal generated by the second LNA to provide a second filtered output signal. An optical attenuator limits the second filtered output signal from the second band pass filter from saturating the photo detector.

DETAILED DESCRIPTION

This disclosure relates to a system that utilizes a substantially constant gain multistage optical amplifier configuration to operate within the dynamic range of an optical detector. Deep atmospheric fading is a fundamental issue on Free Space Optical (FSO) links causing loss of communication for extended periods of time. Such fading can cause intermittent substantial reductions of optical power at a receiver which can last for several microseconds. At high data rates (e.g., 10 Gbps) each instance of a "deep fade" in a standard receiver can cause loss of up to 100,000 bits, loss of clock, and loss of frame. As a consequence, data has to be retransmitted and Quality of Service (QoS) can decrease to intolerable levels. The multistage configuration disclosed herein utilizes saturation properties of a mid-stage optical amplifier to limit upper levels of the received optical signal at the detector. This includes a collaborative set of optical amplifiers interleaved with optical narrow band pass filters followed by an inline attenuator to limit saturation of an optical photo detector.

A first amplifier in the multistage configuration is selected for its noise properties and provides initial optical gain to amplify weak signals above background noise levels during periods of deep atmospheric fading. A second amplifier in the multistage configuration extends the gain of the first amplifier and minimizes dynamic range at the receiver. Notably, during periods of strong received signal strength, the second stage amplifier will saturate and thus limit its output to the detector. Band pass filters can be applied at each stage to limit optical noise bandwidth at the detector. An in-line attenuator further limits optical levels just below saturation of the optical detector. By utilizing a substantially constant multistage gain configuration to both boost weak signals and to limit strong signals, a cost efficient and low error-rate preamplifier can be implemented that eliminates the need for expensive and complex adjustable gain controllers.

Figure 1:
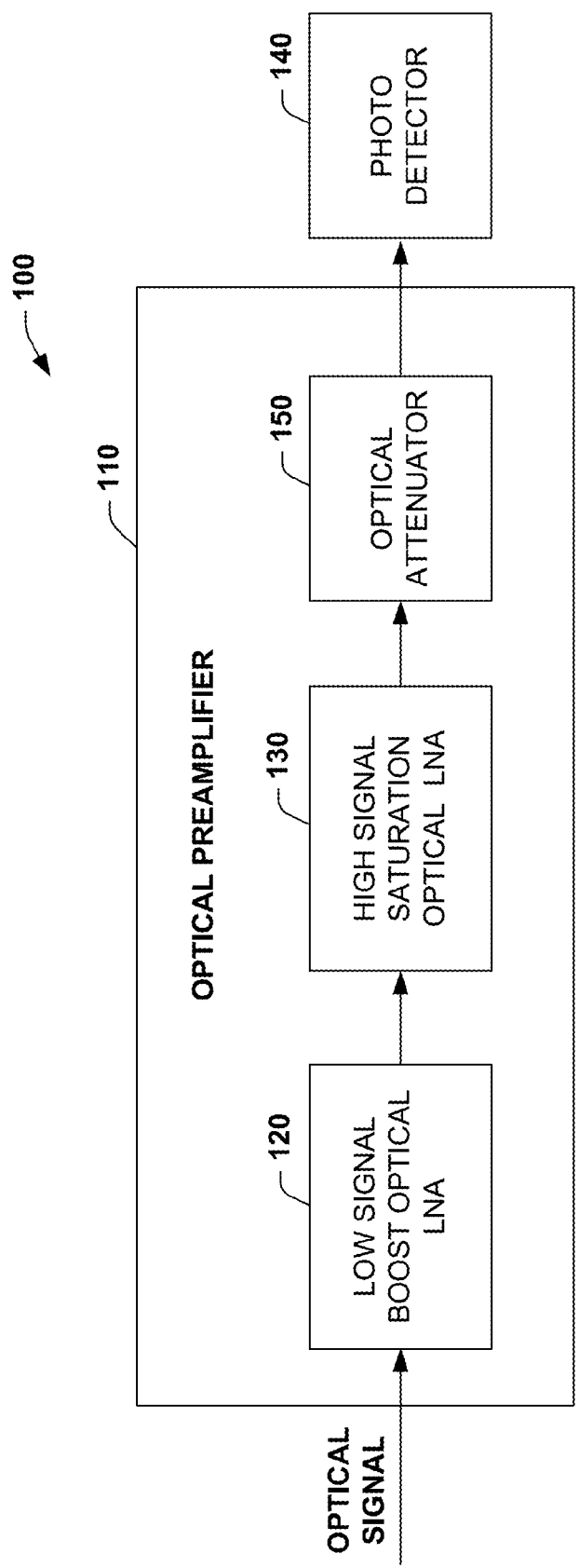
FIG. 1 illustrates an example of a system that utilizes a constant gain multistage optical amplifier configuration to operate within the dynamic range of an optical detector.

FIG. 1 illustrates an example of a system 100 that utilizes a multistage optical configuration to increase the dynamic range of an optical detector. The system 100 includes an optical preamplifier 110 that includes a first low noise amplifier (LNA) 120 having a first gain to amplify an optical input signal. The first LNA 120 generates an amplified optical output signal, where the first gain of the LNA can be set to compensate for signal losses in the optical input signal due to atmospheric fading. The first LNA 120 is generally selected for its noise properties and should be selected to have a desired signal-to-noise ratio (SNR) under the expected worst case signal conditions caused by atmospheric fading. A second LNA 130 having a second gain amplifies the amplified optical output signal from the first LNA 120 and generates a saturated output signal when the combined first and second gain of the first LNA and the second LNA exceeds a predetermined output saturation level of a photo detector 140 (e.g., photo diode, photo transistor). Signals are typically routed in the optical preamplifier 110 via fiber optic connections.

In general, the optical preamplifier 110 operates over a large dynamic range of input signal power strength while mitigating saturation to the photo detector 140. Dynamic range operation of the system 100 will be illustrated and described below with respect to FIG. 2. An optical attenuator 150 limits the saturated signal output of the second LNA 130 from saturating the photo detector 140. The optical attenuator 150 can be a doped filter, a misaligned splice, or a variable neutral density filter, for example.

The first LNA 120 or the second LNA 130 can be a doped fiber amplifier, a semiconductor optical amplifier, or a Raman amplifier, for example. The LNA's 120 and 130 amplify an optical signal directly, without the need to first convert it to an electrical signal. An optical amplifier may be modeled as a laser without an optical cavity, or one in which feedback from the cavity is suppressed. Optical amplifiers are utilized in optical communication and laser physics. There are various physical mechanisms that can be employed to amplify a light signal, which correspond to the major types of optical amplifiers. In doped fiber amplifiers and bulk lasers, stimulated emission in the amplifier's gain medium causes amplification of incoming light. In semiconductor optical amplifiers (SOAs), electron-hole recombination occurs. In Raman amplifiers, Raman scattering of incoming light with phonons in the lattice of the gain medium produces photons coherent with the incoming photons.

Doped fiber amplifiers (DFAs) are optical amplifiers that use a doped optical fiber as a gain medium to amplify an optical signal. They are related to fiber lasers. The signal to be amplified and a pump laser are multiplexed into the doped fiber, and the signal is amplified through interaction with the doping ions. The most common example is the Erbium Doped Fiber Amplifier (EDFA), where the core of a silica fiber is doped with trivalent erbium ions and can be efficiently pumped with a laser. Amplification is achieved by stimulated emission of photons from dopant ions in the doped fiber. The pump laser excites ions into a higher energy from where they can decay via stimulated emission of a photon at the signal wavelength back to a lower energy level. The excited ions can also decay spontaneously (spontaneous emission) or even through non-radiative processes.

Semiconductor optical amplifiers (SOAs) are amplifiers which use a semiconductor to provide the gain medium. These amplifiers have a similar structure to Fabry—Pérot laser diodes but with anti-reflection design elements at the end faces. These can include anti-reflective coatings and tilted wave guide and window regions which can reduce end face reflection to less than 0.001%, for example. Since this creates a loss of power from the cavity which is greater than the gain, it prevents the amplifier from acting as a laser. Semiconductor optical amplifiers are typically made from group III-V compound semiconductors such as GaAs/AlGaAs, InP/InGaAs, InP/InGaAsP and InP/InAlGaAs, for example, though any direct band gap semiconductors such as II-VI could also be used. Such amplifiers are often employed in the form of fiber-pigtailed components, operating at signal wavelengths between 0.85 µm and 1.6 µm and generating gains of up to 30 dB, for example.

In a Raman amplifier, the signal is intensified by Raman amplification. Unlike the EDFA and SOA described herein, the amplification effect is achieved by a nonlinear interaction between the signal and a pump laser within an optical fiber. There are two types of Raman amplifier: distributed and lumped. A distributed Raman amplifier is one in which the transmission fiber is employed as the gain medium by multiplexing a pump wavelength with signal wavelength, while a lumped Raman amplifier utilizes a dedicated, shorter length of fiber to provide amplification. In the case of a lumped Raman amplifier, a highly nonlinear fiber with a small core is employed to increase the interaction between signal and pump wavelengths and thereby reduce the length of fiber required. The pump light may be coupled into the transmission fiber in the same direction as the signal (co-directional pumping), in the opposite direction (contra-directional pumping) or both. Contra-directional pumping is more common as the transfer of noise from the pump to the signal is generally reduced.

As will be illustrated and described below with respect to FIG. 3, at least one optical band pass filter can be provided to filter Amplified Spectral Emission generated by at least one of the first LNA 120 and/or the second LNA 130. The optical band pass filters can include a grating spectrometer, a prism spectrometer, or an interference film filter, for example. In another example, the optical band pass filters can include a tunable band pass filter to set the desired filter characteristics. In one specific example, the tunable band pass filter can be a tunable interference film filter located between two angled fiber optic collimators to select a wavelength of interest by adjusting a tilt angle of the interference film filter with a micrometer, for example. As will be illustrated below with respect to FIG. 5, the system 100 provides substantially error-free operation at about 10 Gbps communication rate from about −53 dbm to about −20 dbm of input power for the optical input signal, where dbm is a decibel rating relative to one milliwatt. The saturated output signal of the second LNA 130 begins to saturate when the combined gain of the first LNA 120 and the second LNA 130 approach about 45 dbm of input power for the optical input signal which will be illustrated below with respect to FIG. 4.

Figure 2:
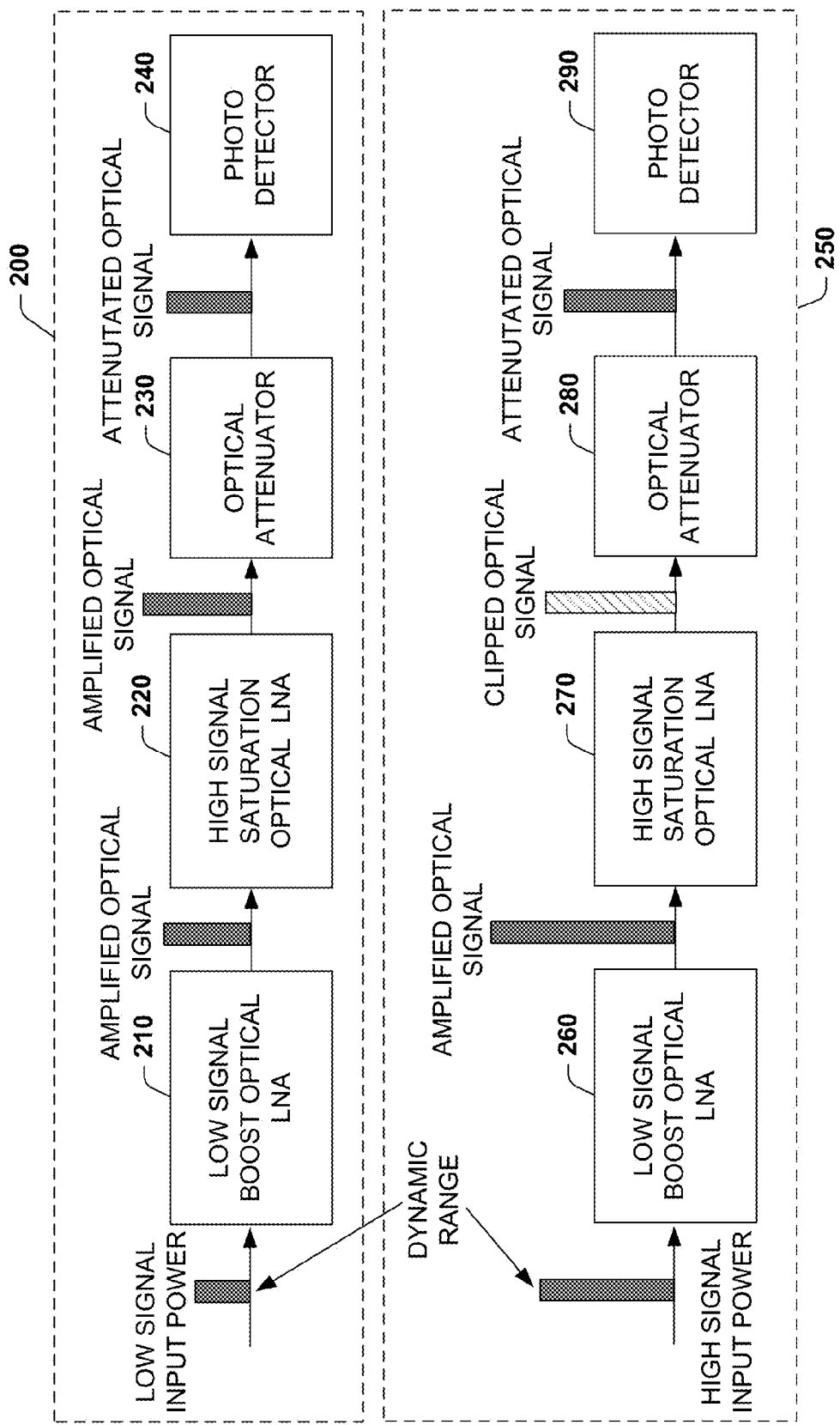
FIG. 2 illustrates an example of signal amplification by the system of FIG. 1 over varying dynamic range from weak signals caused by atmospheric fading to strong signals received under optimal conditions.

FIG. 2 illustrates an example of signal amplification by the system of FIG. 1 over varying dynamic range from weak signals caused by atmospheric fading to strong signals received under optimal conditions. At 200, a multistage configuration includes a low signal gain optical low noise amplifier (LNA) 210 that feeds a high signal saturation optical LNA 220. Output from the LNA 220 is attenuated by an optical attenuator 230 that drives a photo detector 240. At 250, the same multistage configuration as shown at 200 is illustrated however the components are listed as LNA 260, LNA 270, optical attenuator 280, and photo detector 290. A low signal having low input power is illustrated for multistage 200 whereas a high signal having high input power is illustrated for multistage 250. The difference between the input signals—low-to-high, illustrate the dynamic operating range that can be amplified by the multistage configuration to produce desired gain for weak signals due to fading and to limit gain to the photo detector for strong signals. Such limiting is achieved by utilizing the saturation properties of the mid-stage LNA (220, 270) and the optical attenuator (230, 280).

Following the signal path for the low input power signal for the multistage configuration 200, a low input signal is amplified by LNA 210 to produce an amplified optical signal as shown. The amplified optical signal from LNA 210 is again amplified by LNA 220 to produce an amplified optical signal at its output. After the second amplification via LNA 220, the amplified optical signal may still be in the linear region of the amplifier or slightly clipped from a power perspective. Output from the LNA 220 is attenuated via attenuator 230 and an attenuated optical signal drives the photo detector 240. The multistage configuration 250 illustrates signal amplification under high signal conditions. A high input signal is amplified by LNA 260 to produce an amplified optical signal as shown. The amplified optical signal is again amplified by LNA 270 to produce a clipped optical signal at its output. Such clipping limits the amount of power that is available for the photo detector 290 and mitigates saturation of the detector. Clipped output from the LNA 270 is attenuated via attenuator 280 and an attenuated optical signal drives the photo detector 290.

In this example, the collective gain of LNA 260 and LNA 270 drive the LNA 270 into saturation which ultimately limits the amount of power available at the photo detector 290. In this manner, the dynamic range is controlled between two limits. For weak signals caused by atmospheric fading, LNA (210, 260) provide suitable gain to boost the weak signal over background noise levels. For strong signals received under favorable conditions, the saturation of the mid-stage LNA (220 and 270) in addition to the attenuators 230 and 280 operate to mitigate saturation of the photo detectors 240 and 290.

Figure 3:
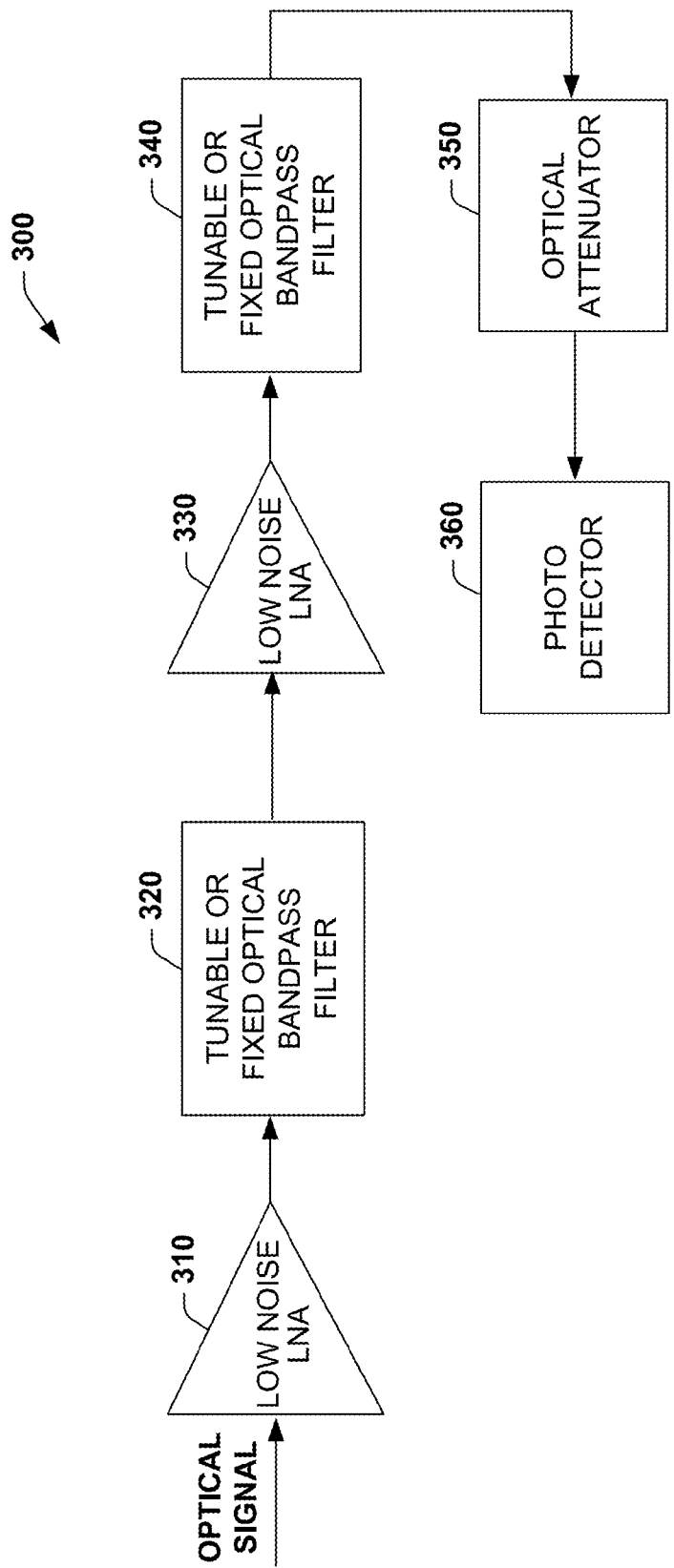
FIG. 3 illustrates an example of a system that utilizes a constant gain multistage optical amplifier configuration, band pass filters, and an optical attenuator to operate within the dynamic range of an optical detector.

FIG. 3 illustrates an example of a system 300 that utilizes a constant gain multistage optical amplifier configuration, band pass filters, and an optical attenuator to operate within the dynamic range of an optical detector. In this example, a first LNA 310 amplifies an optical signal. Output from LNA 310 is filtered by a tunable or fixed optical band pass filter 320. Output from band pass filter 320 is amplified by LNA 330 whose output is also filtered by a tunable or band pass filter 340. Output from band pass filter 340 is passed to an optical attenuator 350 which drives a photo detector 360.

The band pass filters 320 and 340 can be implemented as a fiber optic filter used for wavelength selection, which can select desired wavelengths to pass and reject the others. Such filters can be used for dynamic wavelength selection, signal separation, optical performance monitoring, field tunable optical noise filtering and optical amplifier noise suppression, for example. Such filters can be implemented as a grating spectrometer, a prism spectrometer, or an interference film filter, for example. In a tunable filter example where desired wavelengths can be tuned, a tunable interference film filter located between two angled fiber optic collimators can be provided to select a wavelength of interest by adjusting a tilt angle of the interference film filter with a micrometer, for example.

Fixed optical attenuators 350 can be used in fiber optic systems and may use a variety of principles for their functioning. For example, attenuators can use doped fibers or misaligned splices, since both of these are reliable and inexpensive. Inline style attenuators 350 can be incorporated into patch cables, for example. in another example, variable fiber optic attenuators 350 can use a variable neutral density filter.

Figure 4:
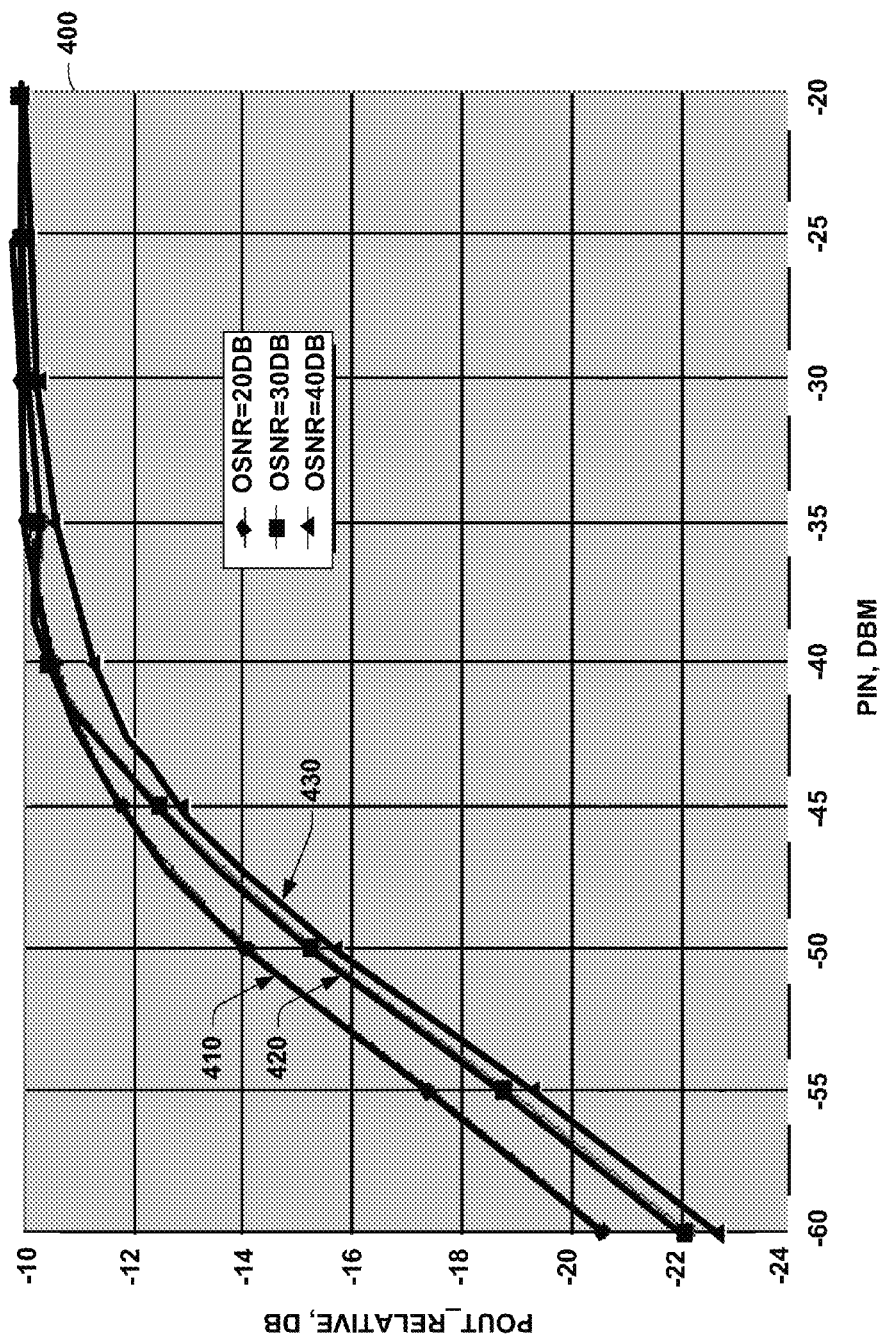
FIG. 4 illustrates example saturation levels for a combined multistage configuration at varying levels of output signal to noise ratio.

FIG. 4 illustrates example saturation levels for a combined multistage configuration at varying levels of output signal to noise ratio. A graph 400 shows measured powered input levels in DBm along the horizontal axis and plotted against measured power output levels in DB on the vertical axis. Three signal plots 410, 420, and 430 show output power variations at varying levels of output power signal to noise ratio of 20 DB, 30 DB, and 40 DB, respectively. As shown, the output power begins to saturate at about −45 DBm of input power. Saturation begins when the collective gains of the first LNA and the second LNA described above drive the second LNA into saturation during periods of high signal level.

Figure 5:
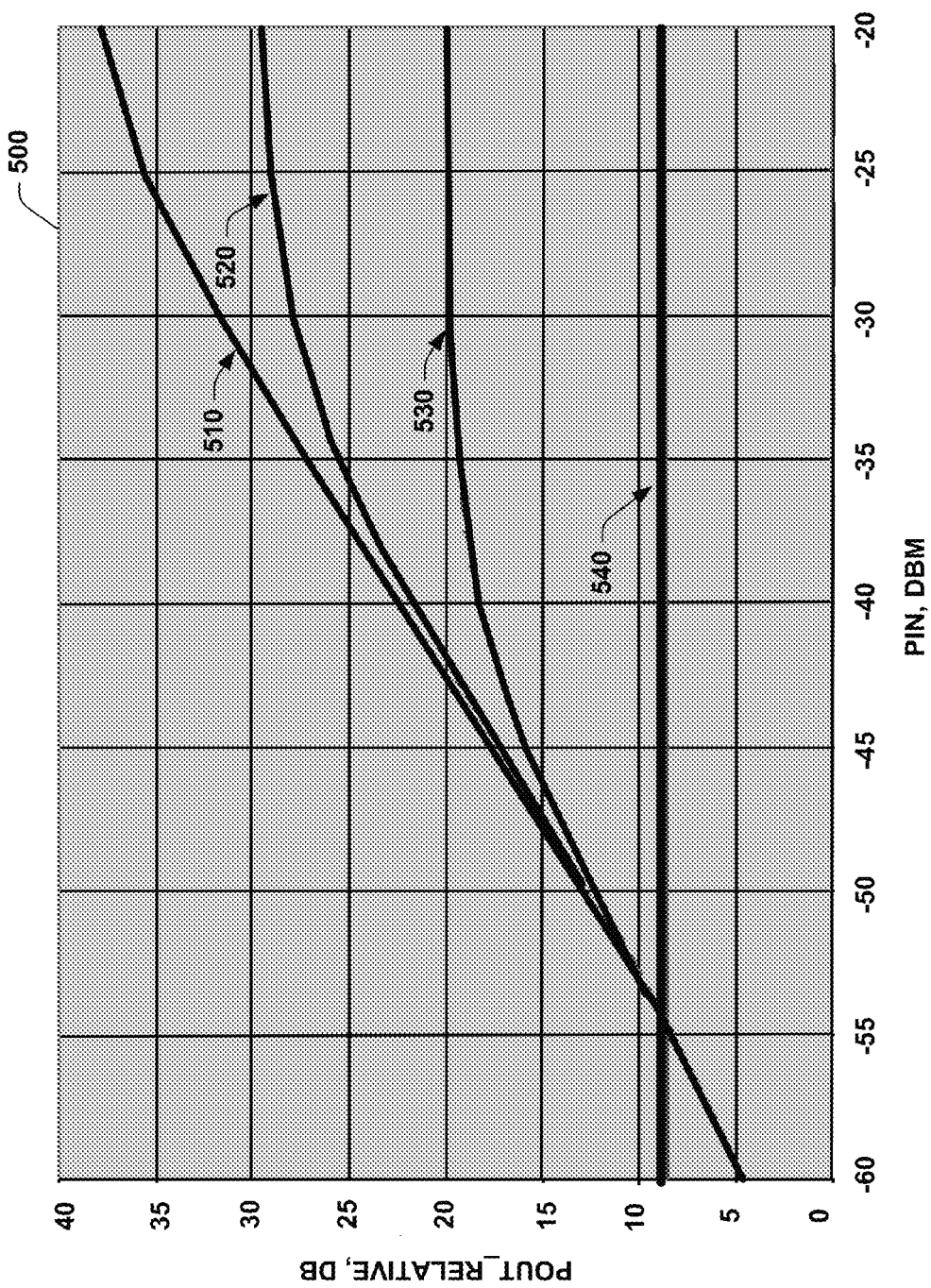
FIG. 5 illustrates example optical preamplifier data rate performance at varying levels of output signal to noise ratio.

FIG. 5 illustrates example optical preamplifier data rate performance at varying levels of output signal to noise ratio. A graph 500 shows measured powered input levels in DBm along the horizontal axis and plotted against measured power output levels in DB on the vertical axis. Three signal plots 510, 520, and 530 show ouptut signal levels at varying levels of output power signal to noise ratio of 20 DB, 30 DB, and 40 DB, respectively. In this measured example, an error line 540 (at about 8 DB output) illustrates signal power levels for the systems described herein where power levels above the error line represent substantially error-free operation at 10 Gbps. As shown, the systems described herein provides substantially error-free operation at about 10 Gbps communication rate from about −53 dbm to about −20 dbm of input power for the optical input signal, where dbm is a decibel rating relative to one milliwatt.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a first low noise amplifier (LNA) having a first gain to amplify an optical input signal and to generate an amplified optical output signal, wherein the first gain is set to compensate for signal losses in the optical input signal due to atmospheric fading; and
   a second LNA having a second gain to amplify the amplified optical output signal from the first LNA and to generate a saturated output signal when the combined first and second gain of the first LNA and the second LNA exceeds a predetermined output saturation level of a photo detector.

2. The system of claim 1, further comprising an optical attenuator to limit the saturated signal output of the second LNA from saturating the photo detector.

3. The system of claim 2, wherein the optical attenuator is at least one of a doped filter, a misaligned splice, and a variable neutral density filter.

4. The system of claim 1, wherein the first LNA or the second LNA is at least one of a doped fiber amplifier, a semiconductor optical amplifier, and a Raman amplifier.

5. The system of claim 1, further comprising at least one optical band pass filter that filters Amplified Spectral Emission generated by at least one of the first LNA or the second LNA.

6. The system of claim 5, wherein the at least one optical band pass filter is a grating spectrometer, a prism spectrometer, or an interference film filter.

7. The system of claim 5, wherein the at least one optical band pass filter is a tunable band pass filter.

8. The system of claim 7, wherein the tunable band pass filter is a tunable interference film filter located between two angled fiber optic collimators to select a wavelength of interest by adjusting a tilt angle of the interference film filter with a micrometer.

9. The system of claim 5, wherein the system provides substantially error-free operation at about 10 Gbps communication rate from about −53 dbm to about −20 dbm of input power for the optical input signal, where dbm is a decibel rating relative to one milliwatt.

10. The system of claim 1, wherein the saturated output signal of the second LNA begins to saturate when the combined gain of the first LNA and the second LNA approach about −45 dbm of input power for the optical input signal.

11. An optical preamplifier comprising:
a first low noise amplifier (LNA) having a first gain to amplify an optical input signal and to generate an amplified optical output signal, wherein the first gain is set to compensate for signal losses in the optical input signal due to atmospheric fading;
a second LNA having a second gain to amplify the amplified optical output signal from the first LNA and to generate a saturated output signal when the combined first and second gain of the first LNA and the second LNA exceeds a predetermined output saturation level of a photo detector; and
an optical attenuator to limit the saturated signal output of the second LNA from saturating the photo detector.

12. The optical preamplifier of claim 11, wherein the optical attenuator is at least one of a doped filter, a misaligned splice, and a variable neutral density filter.

13. The optical preamplifier of claim 11, wherein the first LNA or the second LNA is at least one of a doped fiber amplifier, a semiconductor optical amplifier, and a Raman amplifier.

14. The optical preamplifier of claim 11, further comprising at least one optical band pass filter that filters Amplified Spectral Emission generated by at least one of the first LNA or the second LNA.

15. The optical preamplifier of claim 14, wherein the at least one optical band pass filter is a grating spectrometer, a prism spectrometer, or an interference film filter.

16. The optical preamplifier of claim 14, wherein the at least one optical band pass filter is a tunable band pass filter.

17. The optical preamplifier of claim 16, wherein the tunable band pass filter is a tunable interference film filter located between two angled fiber optic collimators to select a wavelength of interest by adjusting a tilt angle of the interference film filter with a micrometer.

18. An optical preamplifier comprising:
a first low noise amplifier (LNA) having a first gain to amplify an optical input signal and to generate an amplified optical output signal, wherein the first gain is set to compensate for signal losses in the optical input signal due to atmospheric fading;
a first band pass filter that filters the amplified optical output signal generated by the first LNA to provide a first filtered output signal;
a second LNA having a second gain to amplify the first filtered output signal from the first band pass filter and to generate a saturated output signal when the combined first and second gain of the first LNA and the second LNA exceeds a predetermined output saturation level of a photo detector;
a second band pass filter that filters the saturated output signal generated by the second LNA to provide a second filtered output signal; and
an optical attenuator to limit the second filtered output signal from the second band pass filter from saturating the photo detector.

19. The optical preamplifier of claim 18, wherein the optical preamplifier provides substantially error-free operation at about 10 Gbps communication rate from about −53 dbm to about −20 dbm of input power for the optical input signal, where dbm is a decibel rating relative to one milliwatt.

20. The optical preamplifier of claim 18, wherein the saturated output signal of the second LNA begins to saturate when the combined gain of the first LNA and the second LNA approach about −45 dbm of input power for the optical input signal.

* * * * *